United States Patent [19]

Ulmer et al.

[11] Patent Number: 4,462,615
[45] Date of Patent: Jul. 31, 1984

[54] CYLINDER HEAD GASKET

[75] Inventors: Georges Ulmer, Lyons; Bernard C. D. Genin, Venissieux, both of France

[73] Assignee: Societe Anonyme Dite: Curty, Saint-Priest, France

[21] Appl. No.: 491,568

[22] Filed: May 4, 1983

[30] Foreign Application Priority Data

May 27, 1982 [FR] France .............................. 82 09698

[51] Int. Cl.³ .............................................. F16J 15/06
[52] U.S. Cl. .................................. 277/235 B; 277/166
[58] Field of Search ................... 277/166, 165, 235 R, 277/235 B

[56] References Cited

U.S. PATENT DOCUMENTS

| | | | |
|---|---|---|---|
| 2,711,334 | 6/1955 | Balfe | 277/235 B |
| 3,930,656 | 1/1976 | Jelinek | 277/235 B |
| 4,155,561 | 5/1979 | Rudy | 277/235 B |
| 4,272,085 | 6/1981 | Fujikawa | 277/235 B |
| 4,284,282 | 8/1981 | Lonme | 277/235 B |
| 4,428,593 | 1/1984 | Pearlstein | 277/235 B |

Primary Examiner—Robert I. Smith
Attorney, Agent, or Firm—Karl F. Ross; Herbert Dubno

[57] ABSTRACT

A cylinder head gasket has outwardly open grooves formed in the compressible refractory body around the fluid passages to be sealed and sealing strips received in the grooves so that webs of the strips lying along the bottoms of the grooves are set back from the faces of the gasket while wings of the strips overhang these faces adjoining the grooves.

12 Claims, 4 Drawing Figures

CYLINDER HEAD GASKET

CROSS REFERENCE TO RELATED APPLICATIONS

The present application is related to the commonly assigned copending application Ser. Nos. 423,090 filed Sept. 24, 1982 and 465,894 filed Feb. 11, 1983.

FIELD OF THE INVENTION

Our invention relates to a cylinder head gasket and more particularly to a means for forming a fluid-tight seal between the cylinder head and cylinder block of an internal combustion engine.

BACKGROUND OF THE INVENTION

Generally an internal combustion engine will comprise a cylinder block provided with one or more cylinders, each of which receives a piston connected to a crankshaft journaled in the cylinder block by respective connecting rods.

Each of the cylinders may be asssociated with inlet and outlet ports or passages which can be provided with valves, connected to intake and exhaust manifolds, and generally is provided in the region of fluid passages through which a lubricant such as the engine oil and a coolant, such as water or antifreeze solution can be circulated. The ends of the cylinders are closed by cylinder heads which may be bolted to the cylinder block and, to seal the assembly and especially the various fluid passages and compartments from one another, a more or less compressible cylinder head gasket is provided between the cylinder head and the cylinder block and is traversed by the bolts while being provided with an array of ports, cutouts and orifices through which the fluid communication can take place and around which the gasket can seal one fluid passage from another.

The cylinder head gasket thus must perform a number of functions:

Firstly, it must seal the liquid coolant, the liquid lubricant and the gas passages from one another.

Secondly, it must be able to seal the combustion gas within the cylinder at the elevated pressures and temperatures generated by the firing process.

Thirdly, this gasket must constitute a shim, spacer or thickness regulator for the gap between the cylinder head and the engine block, the two elements which are bolted together through the gasket and between which the gasket is sandwiched.

Fourthly, the gasket must serve as a compensating element compensating for geometric irregularities of the sealing faces of the cylinder head and the cylinder block so that the sealing relationship is maintained in spite of manufacturing tolerance deviations and in spite of deformations which occur in operation because of thermal effects or other mechanical distortions.

The gasket must be resistive to heat, must have considerable compressive strength, but must be somewhat yieldable to fulfill these requirements.

Numerous composite gasket structures have been proposed with various drawbacks. For example, fluid sealing can be effected by sandwiching an asbestos plate between a pair of metal foils or sheets (linings), the asbestos plate being reinforced by a perforated metal foil or sheet which is embedded therein and forms a core through the apertures of which the asbestos mass can extend. This embodiment of earlier gasket constructions has been found to be excellent when the two faces which are to be sealed relative to one another, namely, the face of the cylinder head and the face of the block, have excellent planarity and the thermal cycling of the engine does not impose significant constraints on the seal, i.e. the engine parts in contact with the seal are not significantly distorted by the thermal conditions.

In another prior art configuration, around the liquid passages, beads of a yieldable material, such as a silicone can be provided usually below or inwardly of the metal linings which bulge outwardly in the regions of these beads. The beads can be molded independently of the asbestos plate or can be molded onto it.

In still another system, a screen-printing approach has been utilized to apply special sealing beads or cords around the liquid apertures. These beads form annular bulges on the upper and lower surfaces of the gasket, generally of a rounded convex profile.

The beads or cords of these latter systems have been found to resist compression poorly and generally become unsatisfactory and rupture after some use because of thermal cycling and the distortions generally associated therewith.

OBJECTS OF THE INVENTION

It is, therefore, the principal object of the present invention to provide an improved cylinder head gasket whereby the disadvantages of the earlier systems described can be obviated.

Still another object of the invention is to provide a cylinder head gasket for an internal combustion engine which is better able to resist thermal engine cycling, affords improved sealing effectiveness for the various fluids and is particularly capable of resisting compression and other effects commonly developed in the use of a cylinder head gasket.

SUMMARY OF THE INVENTION

These objects and others which will become apparent hereinafter are attained, in accordance with the present invention, by providing a cylinder head gasket having a compressible refractory body, e.g. formed by an asbestos fiber plate with a perforated metal sheet core, formed with the usual apertures, orifices and openings for such a gasket or having around the orifices to be sealed, generally the orifices traversed by the lubricant and cooling fluids, a sealing strip disposed at each face of the gasket and preformed with an outwardly open groove or recess so that in cross section, each such strip is generally outwardly concave and preferably has laterally extending flanges projecting away from the recess or groove.

More specifically, the head gasket of the invention is composed of a body of compressible material provided at each annular zone where sealing is required, with two grooves opening outwardly on the respective opposite faces of the body and each of which receives a sealing strip whose thickness is at most equal to the depth of the groove and which has lateral wings or flanges overlying the faces of the body flanking each groove.

Thus, if one considers the strip, groove and body of the head gasket in section in a plane perpendicular to the latter, the strip has the configuration of an outwardly concave generally flat member with flanges overlying the face of the body to at least one side of the groove and with the strip lining the groove and substantially filling the latter, i.e. covering the bottom of the latter.

Because the flanges or wings lie outwardly of the portion of the strip filling the groove or lining the bottom thereof, the sealing strip has a dual action.

When the joint between the cylinder head and cylinder block is tightened and at the beginning of engine operation, the strip is pressed and deforms under the effect of pressure to provide the seal.

During the functioning of the engine, the part of the strip provided at the base of the groove tends to bulge slightly with respect to the plane of the exterior face of the material, the bulge forming, therefore, in an area which would otherwise be somewhat set back, to increase the sealing action.

We are thus able to obtain good sealing at the start, i.e. when the gasket is set in place because of the clamping compression applied to the region of the strip on either side of the portion thereof lining the bottom of the groove. During cool operations of the thermal cycling, this sealing action predominates. During hot phases of the engine cycling, the outwardly bulging of the material lining the groove contributes to the sealing action and thus the seal is effective throughout the thermal or hot/cold cycling of the engine. In addition, between the two grooves, because a compaction between the two strips on opposite sides of the body, the body of heat resistant material, namely, the asbestos, is particularly dense affording excellent internal sealing. The body need not, in accordance with the invention, be provided with the metal foils or sheets along the broad outer faces. Advantageously, the part of the sealing strip received in the groove is set back slightly so that its outer face lies slightly inwardly of the outer face of the body by several hundredths of a millimeter.

As a consequence, during the settling or working in of the gasket, the zone of the strip within the groove is not subjected to an excess of pressure which may result in its destruction.

According to a feature of the invention, the strip comprises a central or web portion lying along most of the width of the groove and therein, this portion having a thickness which can at most be equal to the depth of the groove, as previously noted. This web is disposed between a pair of lateral portions which can have a thickness slightly greater than the depth of the groove so as to project therefrom and carry the lateral extending wings or flanges whose thickness can in turn be less than that of the web.

The width of the groove formed in the body of the gasket and receiving the sealing strip can range between 1 and 5 mm while its depth is between 0.05 and 0.3 mm.

The lateral flanges or wings can have a thickness of 0.03 to 0.1 mm while the thickness of the web can correspond substantially to that of the groove in its operative range.

The sealing strip can be made by various techniques. For example, it can be applied by silk screening, by molding the strips independently and bonding them subsequently to the plate or slab forming the body, or by molding them in place on the body. For best results, the strips should be formed from a heat resistant silicone rubber.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
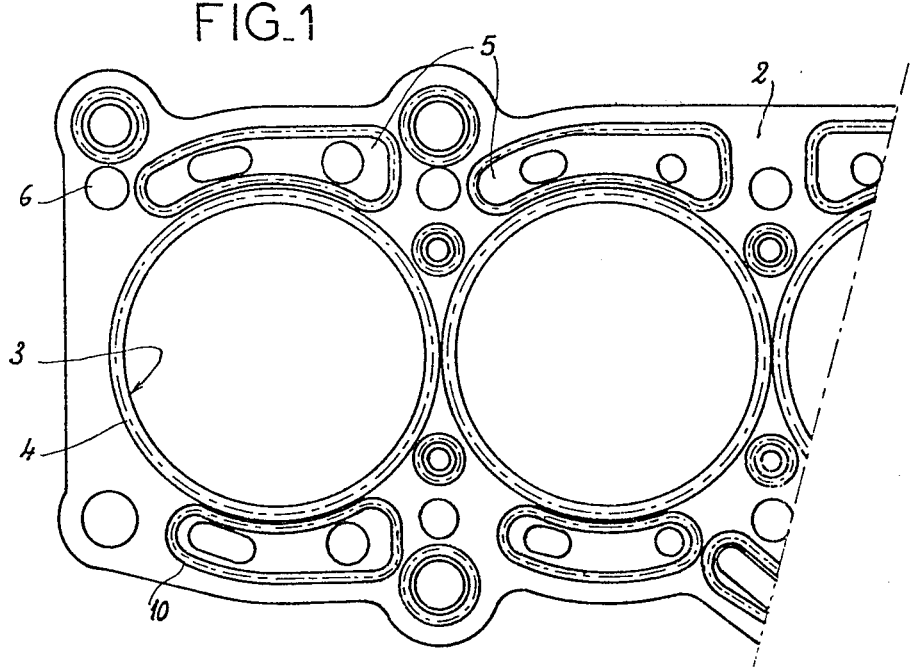
FIG. 1 is a plan view diagrammatically showing a portion of a cylinder head gasket which is applicable for the present invention as well as for the prior art.

As can be seen from FIG. 1, a cylinder head gasket can comprise a flat body generally represented at 2 which can be formed with orifices 3 aligned with the cylinders of a cylinder block and sealing the combustion or firing chambers of the engine. To protect the edges of the body 2 and provide a satisfactory seal, an annular refractory seal 4 can be applied to the cylinder head gasket (see the aforementioned copending applications) around the cylinder openings.

The body 2 is also formed with passages 5 for the liquids such as the lubricating oil and coolant which are circulated through the cylinder block and into the head. These passages are lined as represented at 10 with sealing strips of the type to be described below. In addition, bores 6 can be provided through which the cylinder head bolts pass in compressing the gasket between the cylinder head and the cylinder block.

Figure 2:
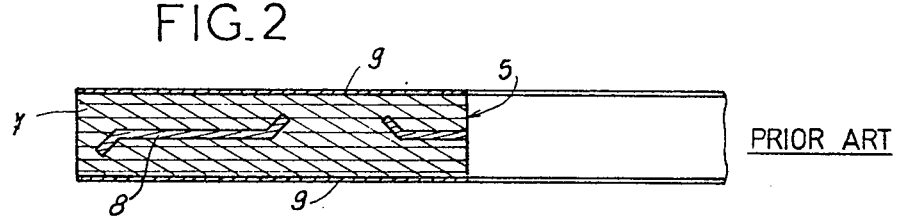
FIGS. 2 and 3 are diagrammatic sections through prior art cylinder head gaskets.
Figure 3:
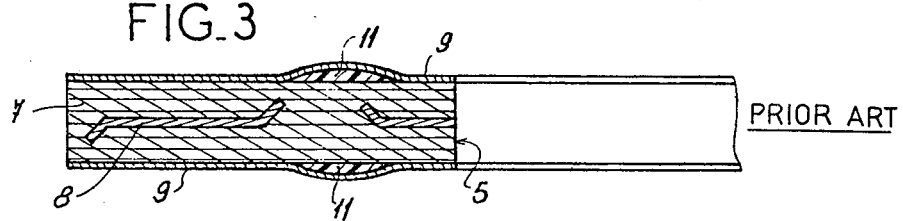

FIG. 2 represents one approach to the construction of a cylinder head gasket and in this approach, instead of special refractory rings 4 or sealing rings 1, the body 2 can be formed from a slab 7 of asbestos fiber reinforced by a perforated metal core 8 and protected on its opposite face with metal layers 9. Of course, sealing rings can be provided as shown in FIG. 3, for example, by depositing a bead 11 around each of the openings to be sealed and covering these rings by the metal sheets 9. These systems have the disadvantages previously described.

Figure 4:
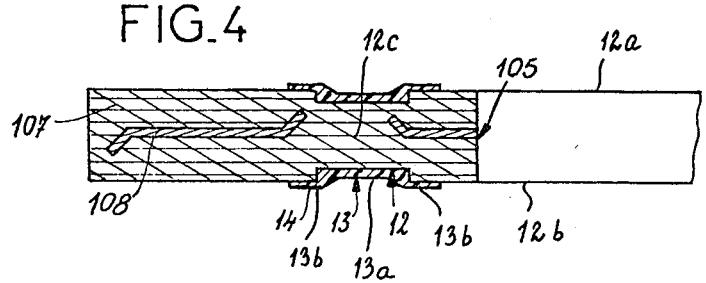
FIG. 4 is a section through a cylinder head gasket according to the invention.

In the embodiment of the invention shown in FIG. 4, however, the slab 107 of asbestos is provided with the perforated metal core 108, but around each opening 105, in the zones represented at 10 in FIG. 1, is provided with a pair of annular grooves 12. One such groove is provided on each face 12a and 12b of the asbestos slab and the two grooves are disposed directly opposite one another so that ultimately the region 12c between them will be densified and have decreased permeability.

Each groove 12 receives a sealing strip which can be formed of silicone rubber. Each strip is generally concave outwardly and has a central web 13 covering the floor of the respective groove and having an outer face 13a, for example, set back slightly from the face 12b, for example, at which the strip is provided. The web 13 is defined between the two lateral portions 13b whose thicknesses are greater than the depth of the groove and which carry the lateral wings or flanges 14 overlying the face 12b, for example, adjoining the groove.

The wings 14 have a thickness less than that of the web 13a and the thickness of the latter may be about 0.05 mm less than the depth of the groove.

When the gasket is clamped in place initially, the sealing is effective primarily at the flanges or wings 14 and with operation and expansion of the web 13, only later in the region of this web. The initial sealing effect is thus pronounced as is the effect upon settling in of the gasket and during use even for considerable periods.

The flanges 14 need not be provided on both sides of each groove in a modification of the invention.

We claim:

1. A cylinder head gasket for an internal combustion engine, comprising a compressible fluid sealing body formed with orifices alignable with cylinders of a cylinder block, holes to be traversed by bolts for clamping the gasket between a cylinder head and the cylinder block, and passages for fluid circulating through the cylinder block, said body being provided around said passages on each face thereof with respective outwardly open grooves, each groove being located opposite a corresponding groove of the other face across the body, and respective sealing strips received in said groves, each of said sealing strips comprising a web disposed in the respective groove and of a thickness at most equal to the depth of the groove, and a lateral flange unitary with said web overlying the respective face of the body adjacent the respective groove.

2. The cylinder head gasket defined in claim 1 wherein each strip is provided with one such flange unitary with the respective web to each side of said groove with the flanges of each strip overlying the respective face of said body adjacent the respective groove.

3. The cylinder head gasket defined in claim 1 wherein each web has an outer surface set inwardly from the respective face of said body by the order of hundredths of a millimeter.

4. The cylinder head gasket defined in claim 2 wherein each web has an outer surface set inwardly from the respective face of said body by the order of hundredths of a millimeter.

5. The cylinder head gasket defined in claim 1 wherein the thickness of each web is greater than the thickness of the flange unitary therewith.

6. The cylinder head gasket defined in claim 3 wherein the thickness of each web is greater than the thickness of the flange unitary therewith.

7. The gasket defined in claim 2 wherein the thickness of said flanges of a respective strip are less than that of the web thereof.

8. The gasket defined in claim 1 wherein the width of each groove is substantially 1 to 5 mm and the depth thereof is substantially 0.05 to 0.3 mm.

9. The gasket defined in claim 2 wherein the width of each groove is substantially 1 to 5 mm and the depth thereof is substantially 0.05 to 0.3 mm, each of said flanges having a thickness of substantially 0.03 to 0.1 mm.

10. The gasket defined in claim 4 wherein the width of each groove is substantially 1 to 5 mm and the depth thereof is substantially 0.05 to 0.3 mm, each of said flanges having a thickness of substantially 0.03 to 0.1 mm.

11. The gasket defined in claim 6 wherein the width of each groove is substantially 1 to 5 mm and the depth thereof is substantially 0.05 to 0.3 mm, each of said flanges having a thickness of substantially 0.03 to 0.1 mm.

12. The gasket defined in claim 7 wherein the width of each groove is substantially 1 to 5 mm and the depth thereof is substantially 0.05 to 0.3 mm, each of said flanges having a thickness of substantially 0.03 to 0.1 mm.

* * * * *